E. KÖRTING.
Locomotive Feed-Water Heater.
No. 205,963. Patented July 16, 1878.
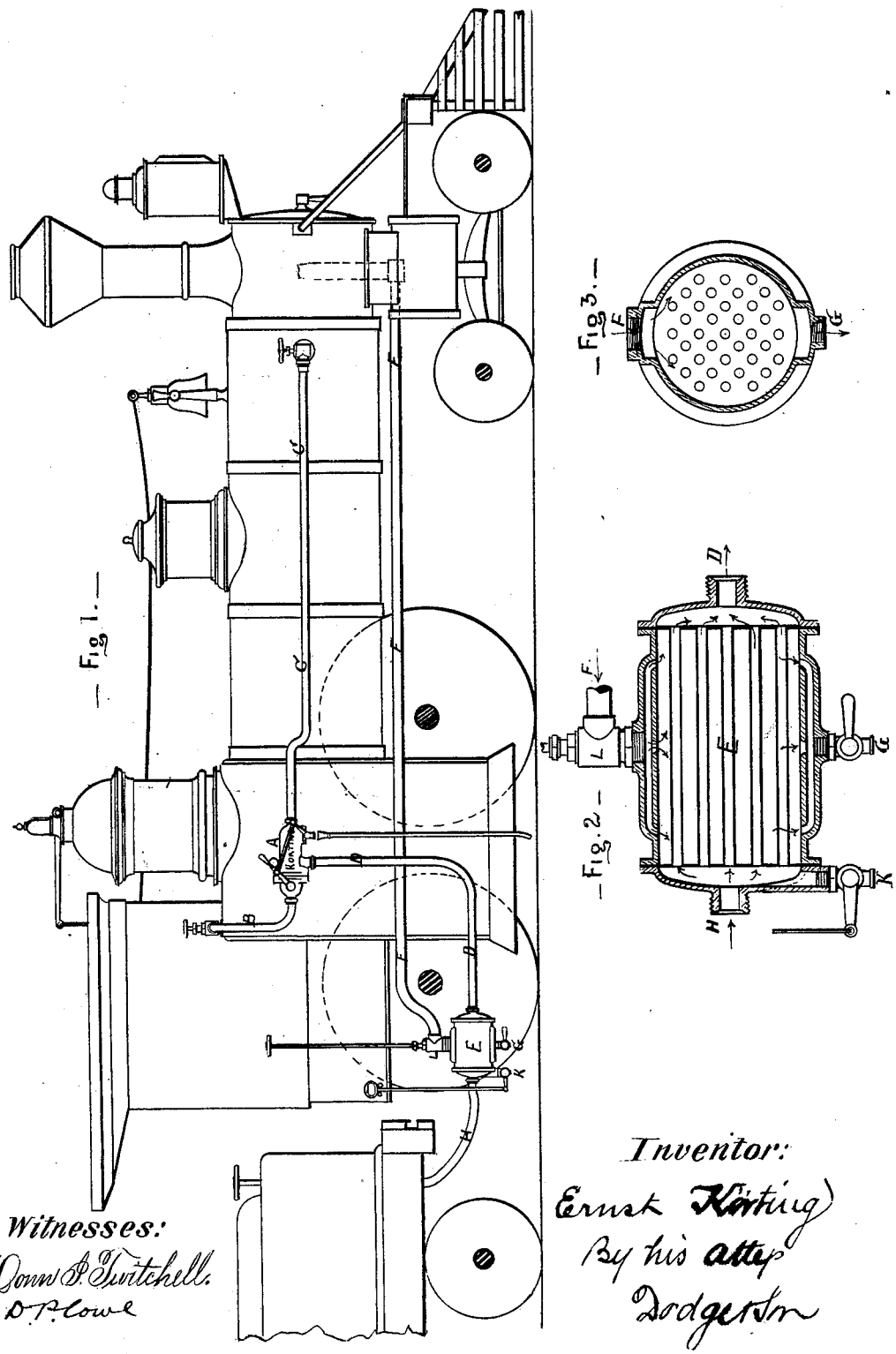

UNITED STATES PATENT OFFICE.

ERNST KÖRTING, OF HANNOVER, PRUSSIA.

IMPROVEMENT IN LOCOMOTIVE FEED-WATER HEATERS.

Specification forming part of Letters Patent No. 205,963, dated July 16, 1878; application filed February 7, 1878.

*To all whom it may concern:*

Be it known that I, ERNST KÖRTING, of Hannover, Prussia, have invented certain Improvements in Feed-Water Heaters for Locomotives, of which the following is a specification:

My invention consists in the combination and arrangement, in a locomotive having an injector to feed its boiler, of a surface-heater located between the tender and injector and connected with the exhaust-steam pipe; and in the use, in this connection, of a cock to regulate the flow of exhaust-steam and the heat of the water.

The object of the invention is to heat the feed-water of boilers which are fed with injectors, especially for locomotives, by means of exhaust-steam, without interfering with the usefulness and positive action of the injector.

The heating of the water for a locomotive by exhaust-steam, to be of value, should be done before the water enters the injector.

The nature of the action of all injectors demands that the temperature of the feed-water before it enters the injector does not exceed a certain limit, beyond which its action becomes uncertain or stops entirely. This limit of temperature differs in the different styles or systems of injectors. As it is imperative that everything about a locomotive should be as positive and certain as it can be made, regardless of cost of construction or working, it is of the utmost necessity that a considerable margin be left before this limit is attained; and, to be sure that this limit is not exceeded, the general practice is, or has been, to entirely dispense with the heating of the water and the therefrom-resulting advantages. Although piston-pumps work well with feed-water heated up to a considerable height of temperature, it has been found that other advantages offered by the use of injectors are such as to induce engineers to entirely dispense with the use of the pumps and ignore the advantage gained through them by using feed-water of high temperature. The combination, therefore, of cold water in the tender, of feed-water heated to a high temperature by exhaust-steam, and the use of the injector are a desideratum, and of great value in locomotive practice.

I obtain this combination in the following manner: Fixed to the engine, and inserted in the water-supply pipe from the tender of the engine, I place a surface-heater, in which the water, in its passage from the tender to the engine, is heated by the exhaust-steam. The exhaust-steam is brought to the surface-heater through a branch from the main exhaust-pipe or from the exhaust-ports of the cylinders, so that the feed-water is heated on its passage from the tender to the injector to a temperature corresponding with and depending on the proportion of the quantity of water passing to the amount of heating-surface in the heater and the amount of exhaust-steam admitted.

In a properly-constructed heater the transfer of heat from the exhaust-steam to the feed-water is almost instantaneous, and a security against an excess over the limit of temperature is obtained by means of a cock or valve in the branch exhaust-pipe to the heater, by which the amount of exhaust-steam admitted is regulated.

The water which is formed in the heater through the condensation of the exhaust-steam may be collected and fed with the injector into the boiler; but I prefer to waste the same on account of the amount of grease contained in it.

I will here observe that on account of the grease contained in the exhaust-steam I prefer in every case the system of surface condensation to the heating of the tender-water by the direct admission and mixing of the exhaust-steam with the tender-water.

The surface-heater may be made in a variety of ways, differing in the details of construction, so as to obtain the greatest amount of heating-surface in comparison to the proportion of areas and sizes.

Preferably, as offering the greatest facility of construction, I have shown in the annexed drawing a heater composed of a great number of small cylindrical tubes, through which the water flows on its way to the injector, and which tubes come in contact with the exhaust-steam on their outside surfaces.

The combination, as above described, offers the advantage that it in no way interferes with the certainty of the action of the injector, as the quantity of exhaust-steam admitted to the heater may be regulated or entirely stopped at any moment, and thereby the temperature of the water be regulated at will, or quite cold water admitted to the injector.

As exhaust-steam is at disposal at all times, the temperature of the feed-water is increased to its maximum limit at the beginning of running, and at all times, so that thereby a constant increase of power is gained in the locomotive.

As the injector is fixed on the engine, the labor of coupling and uncoupling the exhaust branch pipe to the heater is not required.

The exhaust branch pipe need be of but limited diameter, and the quantity of exhaust-steam extracted for heating does not interfere with the production of draft through the boiler.

In the annexed drawing, Figure 1 shows an injector combined with a heater on a locomotive. Fig. 2 is an enlarged longitudinal section through the heater, and Fig. 3 a cross-section through the same.

A is the injector; B, the steam-pipe of the same; C, discharge-pipe from injector to boiler; D, suction-pipe from heater to injector; E, heater; F, branch exhaust-steam pipe from the main exhaust-pipe to the heater; G, discharge pipe or cock for the condensed water from the heater; H, water-supply pipe from the tender to the heater; K, a cock to empty heater and pipes from tender to injector of water; L, a regulating-valve in the exhaust-steam branch pipe to regulate amount of exhaust-steam to heater.

The special arrangement of the heater and injector may, of course, be varied to suit the different styles of engines. The heater may be required to be placed in front of the engine, and the suction-pipe from heater be brought back to injector; or the injector may be placed below the heater instead of above, as shown here, in which case the cock or valve K on water-space of heater for the clearing of the heater and connecting water-pipes may be dispensed with, as its purpose can in that case be accomplished by the starting-cock of the injector.

I do not claim, broadly, the application of a heater to a locomotive, nor the combination of an injector and feed-water heater, nor the use of exhaust-steam to heat feed-water; but What I do claim is—

1. On a locomotive or other traveling engine, the combination of an injector, a surface-heater located between the injector and water-reservoir, and a pipe conducting exhaust-steam to the heater, as shown.

2. On a locomotive-engine, the combination of a feed-water injector, a surface-heater located between the injector and tender, a pipe conducting exhaust-steam to the heater, and a cock or valve to regulate or stop the flow of exhaust-steam, as shown.

ERNST KÖRTING.

Witnesses:
A. M. SUISON,
OTTO DAVISSON.